Oct. 25, 1960     S. S. STURGEON     2,957,710
INSTRUMENTATION DEVICE PIPING ASSEMBLY
Filed May 11, 1956
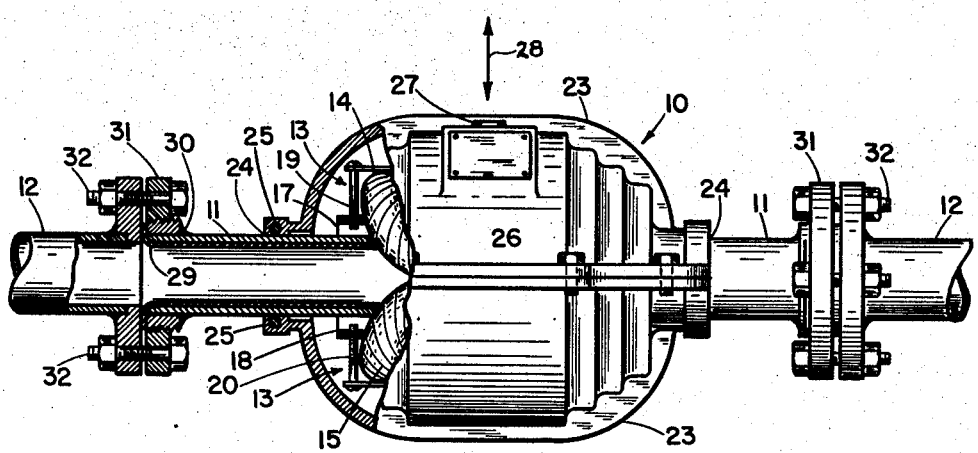
FIG. I
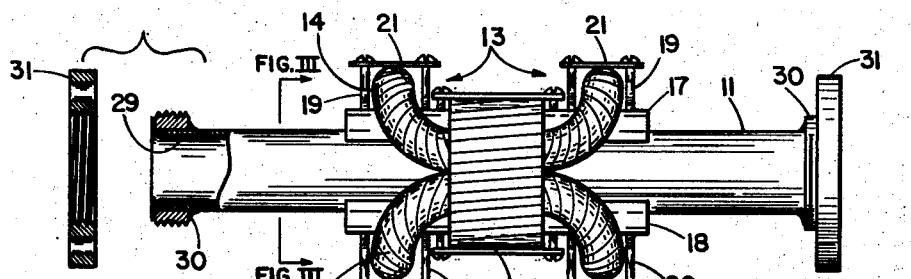
FIG. II
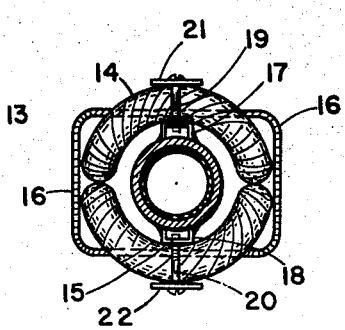
FIG. III
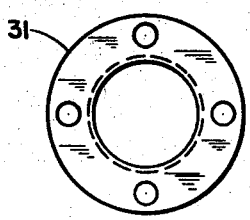
FIG. IV
INVENTOR
STOCKER S. STURGEON
BY
Lawrence H. Poeton
AGENT

United States Patent Office 2,957,710
Patented Oct. 25, 1960

2,957,710

INSTRUMENTATION DEVICE PIPING ASSEMBLY

Stocker S. Sturgeon, Foxboro, Mass., assignor to The Foxboro Company, Foxboro, Mass., a corporation of Massachusetts Filed May 11, 1956, Ser. No. 584,371

1 Claim. (Cl. 285—55)

This invention relates to the assembly of instrumentation devices with respect to pipe lines with which such devices are operatively associated.

Instrumentation devices of this nature include, for example, valves, pressure sensing devices, and as a specific illustration herein, the flow sensing unit of an electromagnetic flowmeter.

Where indicating, recording, or control instruments are used with respect to pipe lines, some form of continuance of the pipe line is usually embodied in the instrument arrangement, and the insertion of this pipe line continuance into the pipe line itself poses problems of alignment, sealing with respect to the contents of the pipe line, initial assembly, and disassembly for purposes of service or replacement.

In the past such embodiments have been established as portions of the pipe lines with the above-mentioned difficulties particularly evident when a section of the pipe line has to be removed and the instrument device substituted therefor between the two pipe line ends thus established.

This invention provides means for overcoming the prior art difficulties, in that when an instrumentation device is to be incorporated into a pipe line, adjustable alignment means is provided, along with a positive sealing arrangement and means for simple assembly and disassembly.

With respect to the illustrative example herein of an electromagnetic flow sensing unit, this invention provides adjustable alignment means, means for sealing an inner pipe liner, and means for endwise assembly and disassembly of a unitary electromagnetic coil unit with respect to a length of pipe.

This invention has the further advantage of using special forms of expensive pipe material essentially only where the special character of such pipe material is needed.

It is therefore, an object of this invention to provide a new and improved instrumentation device piping assembly.

Another object is to provide a new and improved electromagnetic flow sensing unit piping assembly.

Other objects and advantages of this invention will be in part apparent and in part pointed out hereinafter and in the accompanying drawings, wherein:

Figure I is a showing, in partial section, of an electromagnetic flowmeter sensing unit assembly as an illustrative embodiment of this invention;

Figure II is a showing of the pipe and end flange construction of the assembly of Figure I, with an electromagnetic coil assembly thereon;

Figure III is a cross-section of the arrangement of Figure II, taken on line III—III in Figure II, and illustrating the magnetic coil unit thereon; and Figure IV is a face view of either of the pipe end flange rings of Figure II, in the form of a piping assembly ring.

The illustrative embodiment of this invention as shown in the drawings is concerned with the assembly of an instrumentation device in the form of an electromagnetic flow sensing unit 10 mounted on a length of pipe 11 and inserted in a pipe line 12 with the pipe length 11 arranged as a continuance of the pipe line 12.

The electromagnetic flow sensing unit 10 operates on Faraday's law of electromagnetic induction in that the voltage induced in a conductor of given length, moving through a magnetic field, is proportional to the velocity of the conductor. An electromagnetic coil assembly 13 is provided for establishing an electromagnetic field within the pipe length 11. This coil assembly 13, as illustrated in Figures I and III, is generally a cylindrical sleeve formed of two major windings 14 and 15, each in generally oval, draped form, placed edge to edge and belted by an electromagnetic core strap 16 (Figure III) with the whole assembly 13 mounted over the pipe length 11 as an outer sleeve with respect thereto. The output of the sensing unit 10 is a voltage taken from poles (not shown) which are open to the interior of the pipe length 11.

In order to most effectively locate and distribute the most desirable concentrations of the electromagnetic field within the pipe length 11, the coil assembly 13 is formed with an inner diameter substantially greater than the outer diameter of the pipe length 11, and a coil assembly supporting arrangement is provided in the form of U-channel brackets 17 and 18, secured to the pipe length 11, in diametric opposition to each other, and laid lengthwise of the pipe length 11 with the U openings faced against the outer wall of the pipe length 11. The coil windings 14 and 15 are bolted to the brackets 17 and 18 by means of bolts 19 and 20, and straps 21 and 22. For the general protection of the coil assembly, a split cover 23 (Figure I), is provided therefor, formed and split into halves like a walnut shell with end openings 24 fitting over the pipe length 11 and with suitable O-rings 25 within the openings 24, mounted in the ends of the cover 23 and bearing on the pipe length 11 to seal out dirt and moisture from the coil assembly 13. The halves of the cover 23 are joined by bolts 26 at the meeting edges of the cover halves. Suitable electrical leads to the coil assembly 13 and from the electrical poles (not shown) may be taken through the sensing unit housing 23 through an apertured boss 27 (Figure I) as indicated by the arrow 28.

The pipe length 11, and the channel brackets 17 and 18, since they are largely encompassed by the electromagnetic coil assembly 13, must be of non-magnetic material such as one of the non-magnetic 300 series of stainless steel, in order not to interfere with the suitable establishment of a magnetic field within the pipe length 11 or with the measurements taken with respect thereto. The sensing unit housing 23 may be of any desired material, for example aluminum, since it lies outside of the coil assembly 13 and will not undesirably affect the electromagnetic field within the pipe length 11.

Within the tube, a lining sleeve 29 is provided, to prevent short-circuiting of the generated voltage. This sleeve may be formed of any of the conventional electrical insulating materials of the nature of rubber, plastic or the like, with preference given to material which may be sprayed on and which is impervious to the chemical and physical action of the liquid which is to flow through the pipe length 11 for a particular application of the device of this invention. Special end formations of the liner sleeve 29 are provided, with respect to the ends of the pipe length 11, as will be explained hereinafter.

An important feature of the combination of this invention is the structure and arrangement with respect to the ends of the pipe length 11, in relation to the mounting and dismounting of the coil assembly 13 on the pipe length 11, in relation to the end arrangement of the inner lining sleeve 29, and in relation to the connection of the instrumentation device to the pipe line 12.

The pipe length 11 is a one-piece structure, of essentially uniform thickness and diameter throughout its length. A common practice in joining one pipe length to another is to weld flanges on the ends of the pipes and to thereafter join the flanges. This practice provides good abutting end surfaces for the pipes being joined, and avoids sealing problems with respect to threaded joints of flange and pipe in the area of abutment of the pipe ends. In the case of the illustrative example of this invention, however, and in other similar instrument assemblies, it is difficult to first assemble the coil assembly 13 over the end of the pipe length 11 and thereafter to weld a flange on the end of the pipe length 11 without damaging the coil assembly during the welding process. In order to be properly effective and of reasonable mechanical arrangement, the inner diameter of the coil assembly 13 must be substantially less than the outer diameter of a suitable end flange for the pipe length 11. Further, the coil assembly 13 is a unitary arrangement, and splitting this assembly for the purpose of two-part assembly in the manner of the cover 23 would substantially undesirably affect the electrical characteristics of the coil assembly 13. Thus the coil assembly 13 must be mounted over an end of the pipe length 11, and any welding operation must be done before such mounting.

In order to accomplish the above purpose, and at the same time provide the desirable pipe end abutting face and flange connections, the ends of the pipe length 11 are provided with metal flange collars 30. These collars are welded to the pipe length 11 flush with the ends thereof so that the end surfaces of the pipe length 11 and the outer end surfaces of the collars 30 form single annular end surfaces for the instrumentation assembly to use in abutting assembly with the ends of the pipe line 12. The radial thickness of the collars 30 is essentially equal to the radial depth of the support channels 17 and 18 as assembled, so that the coil assembly 13, having an inside diameter sufficient to encompass the pipe length 11 and the support channels 17 and 18 thereon, may be mounted on the pipe length 11 over an end thereof, after the collar 30 has been welded to the pipe length 11. Thus the coil assembly 13 is not endangered by the welding of the collars 30 to the pipe length 11.

As previously mentioned, the insulating lining sleeve 29 is provided with special end formations, that is, the lining is continuous, from inside the pipe length 11, in right angled formations which cover the end faces of the pipe length 11 and the end faces of the collars 30. Thus the ends of the lining sleeve 29 are clamped between the end flanges of the pipe line 12 and the single end faces each formed by a combination of an annular end of the pipe length 11 and the annular outer end of the associated collar 30. This arrangement not only seals off the pipe joining abutments but avoids the presentation of a lining end edge to any part of a flow within the pipes which could result in the loosening or detachment of the lining sleeve 29.

The final factor of the combination of this invention is an annular, ordinary metal, ring flange 31 which is threadedly mounted on the periphery of each of the flange collars 30. The flange 31 is so formed as to combine with its associated collar 30 to provide a flange combination which may be at least equal in dimension and strength to the conventional unitary flange of the prior art. However, the ring flange (31) arrangement of this invention provides the advantage that it may be turned back on the collar 30 until end abutment of the pipes (12, 11) leaves a take-up space between the end flange of the pipe line 12 and the ring flange 31. Thus assembly bolts 32 may be used to draw the pipe end arrangements together in strong, sealing abutments, without abutting the end flanges of the pipe line 12 and the ring flanges 31.

The ring flanges 31 provide a further particular advantage in that they may be rotated for easy alignment of bolt holes rather than the prior art cumbersome and undesirable method of rotating the entire assembly. The device of this invention therefor lends itself to the ready assembly and disassembly of instrumentation combinations with respect to pipe lines, as a real advantage in experimental procedures for frequent assembly and disassembly, in devices where it may be important for the instrumentation always to be exactly radially positioned, and in the expedition of ordinary initial and service assembly and disassembly, particularly where the pipe sizes are substantial.

It should be noted that an appreciable cost saving is made possible since only the pipe length 11 and the channel brackets 17 and 18 are necessarily made of expensive stainless steel.

This invention, therefore, provides a new and improved instrumentation device piping assembly.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

A metal pipe coupling assembly wherein a pair of pipe ends are joined through a pipe end coupling relation between a radially large fixed flange and a radially small fixed flange squeezing the flared end of a pipe liner between a radially inner portion only of the large fixed flange and a combination of the small fixed flange and the end face of the pipe end on which the small flange is fixed, wherein a ring flange is mountable over the pipe end on which the small flange is fixed and threaded for mounting on and movement along the small flange to provide a combination of a two-part flange unit on one pipe end and a one-part flange unit on the other pipe end, wherein an air gap is established between the ring flange and the radially outer portion of the large fixed flange, and wherein connection bolts join the ring flange and the large fixed flange through the air gap to secure the said coupling relation, said pipe coupling assembly thus comprising, in combination, a pair of equal size, aligned pipe ends with equal and uniform diameters and wall thicknesses throughout, one of said pipe ends being formed of non-magnetic stainless steel, a radially small fixed flange with uniform thickness and uniform radial dimension and welded to the radially outer face of said one of said pipe ends in end flush relation with the end of said one of said pipe ends and presenting a joint end face therewith in a single radial plane, said small fixed flange being threaded on its radially outer face concentrically with said one of said pipe ends, a movable ring flange with uniform thickness and uniform radial dimension mountable over said one of said pipe ends and rotatably mounted on said small fixed flange in interthreaded relation therewith for adjustment movement axially along said one of said pipe ends to a point inwardly spaced from the end face of said one of said pipe ends, with connection bolt openings through said movable ring flange, a radially large, fixed flange welded to the outer face of the other of said pipe ends and presenting an end face in a single radial plane, the radial extent of said large fixed flange equalling the combination of the radial extents of said small fixed flange and said movable ring on said one of said pipe ends, plus the full wall thickness of said one of said pipe ends, said radially large flange having uniform thickness and uniform radial dimension except for a step portion included in its said radial extent and providing a single radial plane end facing on said other of said pipe ends, with said step portion having an inner ring face in flush relation with the inner face of said other of said pipe ends, connection bolt openings through said fixed, radially large flange, an end flared one piece plastic sleeve liner in said one of said pipe ends with said flared end of said liner extending radially outward between said radially small fixed flange and said radially large fixed flange and terminating at the outer diameter of said radially small fixed flange, whereby an air gap is established between said rotatable ring flange and the radially outer portion of said radially large fixed flange with said air gap being enlarged when said rotatable ring flange is moved inwardly along said outer face thread of said one of said pipe ends, with the pipe end coupling relation of said assembly accomplished by squeezing said liner flared end between said radially large, fixed ring flange and the single radial plane surface provided by the end flush combination of the end face of said one of said pipe ends and the lengthwise outer end face of said small fixed flange thereon, said air gap providing takeup space for increasing the pressure of said coupling relation, and connector bolts through said bolt openings for accomplishing said takeup and for maintaining said coupling relation.

References Cited in the file of this patent

UNITED STATES PATENTS

| | | |
|---|---|---|
| 462,894 | Dinsmore | Nov. 10, 1891 |
| 800,802 | Franquist | Oct. 3, 1905 |
| 807,662 | Crowther | Dec. 19, 1905 |
| 870,557 | Haus | Nov. 12, 1907 |
| 1,796,159 | Pallady | Mar. 10, 1931 |
| 1,817,289 | Benz | Aug. 4, 1931 |
| 2,031,849 | O'Leary | Feb. 25, 1936 |
| 2,290,333 | Johnson | July 21, 1942 |
| 2,446,481 | Letterman | Aug. 3, 1948 |
| 2,568,414 | Russ | Sept. 18, 1951 |
| 2,608,501 | Kimble | Aug. 26, 1952 |
| 2,724,268 | Raynsford | Nov. 22, 1955 |

FOREIGN PATENTS

| | | |
|---|---|---|
| 591,611 | Great Britain | Aug. 22, 1947 |
| 656,032 | Great Britain | Aug. 8, 1951 |
| 526,147 | Belgium | Aug. 2, 1954 |